United States Patent [19]
Sawada

[11] Patent Number: 5,537,221
[45] Date of Patent: Jul. 16, 1996

[54] TRANSMISSION DEVICE FOR MULTI-MODE COMMUNICATIONS

[75] Inventor: Nozomi Sawada, Ebina, Japan

[73] Assignee: Ricoh Company, Ltd., Tokyo, Japan

[21] Appl. No.: 79,217

[22] Filed: Jun. 21, 1993

Related U.S. Application Data

[63] Continuation of Ser. No. 593,888, Oct. 5, 1990, abandoned.

[30] Foreign Application Priority Data

Oct. 6, 1989 [JP] Japan .................................... 1-261382

[51] Int. Cl.$^6$ .................................................. G06F 13/38
[52] U.S. Cl. ...................................... 358/450; 364/DIG. 1
[58] Field of Search ........................... 395/800; 379/100; 358/448, 450, 452

[56] References Cited

U.S. PATENT DOCUMENTS

| | | | |
|---|---|---|---|
| 4,667,248 | 5/1987 | Kanno | 358/280 |
| 4,672,459 | 6/1987 | Kudo | 358/452 |
| 4,827,349 | 5/1989 | Ogata et al. | 358/256 |
| 4,907,094 | 3/1990 | Mishima et al. | 358/437 |
| 4,918,723 | 4/1992 | Iggulden et al. | 358/452 |
| 5,006,937 | 4/1991 | Nonoshita et al. | 358/456 |
| 5,008,853 | 4/1991 | Bly et al. | 364/518 |
| 5,086,434 | 2/1992 | Abe et al. | 358/450 |
| 5,095,445 | 3/1992 | Sekiguchi | 364/514 |
| 5,113,492 | 5/1992 | Ariki et al. | 395/147 |

OTHER PUBLICATIONS

Stone, David M. "Getting the Most from WordStar and Mail Merge", Prentice–Hall Pub, ISBN: 0-13-354390-0 pp. 16–17, Copyright 1984.

Alfieri, V. "The Best Book of: WordStar Features Release 5" First Printing 1988, ISBN:0-672-48434-X, pp. 63–68 & pp. 345–368.

Stewart et al. "Using Word Perfect 5", Copyright 1988, Que Publishers, pp. 14, 169, 222, 223.

*Primary Examiner*—William M. Treat
*Attorney, Agent, or Firm*—Oblon, Spivak, McClelland, Maier & Neustadt

[57] ABSTRACT

A mixed mode telecommunication terminal comprises a character input unit for inputting characters, an image scanner for converting an input image into first image data, a modification data inputting unit for inputting modification data indicating modification of character data that are inputted by the character input unit, a character data conversion unit supplied with the modification data and the character data for converting the character data into second image data, a document editor supplied for producing a first mixed mode document wherein the character data, the first image data and modified character data are assembled into a desired arrangement, the document editing means further producing layout data that specifies the desired layout in the first mixed mode document; a document synthesis part for assembling the character data, the first image data and the second image data into a second mixed mode document according to the layout data, and a transmission unit for transmitting the second mixed mode document over a telecommunication network.

9 Claims, 4 Drawing Sheets

| BLK | LOC | SIZE | ATTRB | RESOL |
|---|---|---|---|---|
| BLK 1 | $X_1, Y_1$ | $L_{x1}, L_{y1}$ | CHAR | NONE |
| BLK 2 | $X_2, Y_2$ | $L_{x2}, L_{y2}$ | CHAR/MOD | NONE |
| BLK 3 | $X_3, Y_3$ | $L_{x3}, L_{y3}$ | IMG | HIGH |
| BLK 4 | $X_4, Y_4$ | $L_{x4}, L_{y4}$ | LINE | NONE |
| --- | --- | --- | | |

| BLK | LOC | SIZE | ATTRB | RESOL |
|---|---|---|---|---|
| BLK1 | $X_1, Y_1$ | $L_{x1}, L_{y1}$ | CHAR | NONE |
| BLK2 | $X_2, Y_2$ | $L_{x2}', L_{y2}'$ | IMG | HIGH |
| BLK3 | $X_3, Y_3$ | $L_{x3}, L_{y3}$ | IMG | HIGH |
| BLK4 | $X_4, Y_4$ | $L_{x4}', L_{y4}'$ | IMG | HIGH |

FIG. 4C

TRANSMISSION DEVICE FOR MULTI-MODE COMMUNICATIONS

This application is a Continuation of application Ser. No. 07/593,888, filed on Oct. 5, 1990, now abandoned.

BACKGROUND OF THE INVENTION

The present invention generally relates to terminals for telecommunications and more particularly to a mixed mode telecommunication terminal having a capability of communicating in the Class-III of the G4 facsimile system.

In the ISDN (Integrated Service Digital Network) system, various terminal apparatuses are used. One example is the G4 facsimile terminals used as a facsimile apparatus for image transmission, a teletex terminal for character transmission, and a mixed mode terminal for documents. In the last mode, character information and image information are mixed in a single document.

Conventionally, the function of the mixed mode terminal is realized in the Class-III terminal of the G4 facsimile system. In such a mixed mode terminal, a mixed mode document is formed for transmission from character data inputted through a keyboard and image data inputted by scanning an image. When transmitting the mixed mode document, the character data and the image data are transmitted separately. In the reception side terminal, the original mixed mode document is recovered from the transmitted character data and the image data and subsequently outputted for display or printing on a sheet.

In such a conventional mixed mode terminal, the type face such as the font and size of the characters than can be transmitted is usually limited, according to the CCITT recommendation, to those shown in TABLE I.

TABLE I

| type face | character size | | |
|---|---|---|---|
| ordinary | 1/2 | 1/1 | 2/1 |
| bold | 1/2 | 1/1 | 2/1 |
| italic | 1/2 | 1/1 | 2/1 |

Because of the restriction in the font and size of the characters that are allowed for transmission in the mixed mode, the conventional Class-III terminal of the G4 facsimile has been unable to transmit versatile documents such as those created by the DTP (desk-to-publishing) system. In addition, there has been an inconvenience such that documents including line images like tables and block diagrams, have to be converted to the image data before the transmission. When the G4 facsimile terminal has not the function of converting the line data to the image data, then one cannot achieve the transmission of the line data at all.

In such circumstances, there has been no alternative but to output the entire document once on a recording sheet and transmit the document after conversion into bit map data. Thereby, the bit map data is transmitted as the Class-I data (image data) of the G4 facsimile system. When this procedure is followed, however, there occurs an increase in the information to be transmitted and the efficiency in the transmission is inevitably deteriorated.

Further, it should be noted that, in the foregoing case, the advantage achieved by the Class-III of the G4 facsimile system may be lost almost. More specifically, in the Class-III transmission, the character data is transmitted in the form of character codes, and because of this, an excellent quality in the reproduced character image is guaranteed as long as a high resolution plotter is employed in the reception side terminal. This holds true even when the resolution of image scanning in the transmission side terminal is poor. Obviously, this advantage is not enjoyed when the character data is transmitted after conversion into the image data by scanning in the transmission side terminal. About the increase in the information to be transmitted, it should be noted that the amount of information needed for transmitting the character codes is much smaller than the case of transmitting the image data.

SUMMARY OF THE INVENTION

Accordingly, it is a general object of the present invention to provide a novel and useful mixed mode telecommunication terminal, wherein the aforementioned problems are eliminated.

Another and more specific object of the present invention is to provide a mixed mode telecommunication terminal for transmitting documents, wherein the documents including therein images and characters of versatile fonts and sizes are transmitted with excellent quality and reduced amount of information.

Another object of the present invention is to provide a mixed mode telecommunication terminal for transmitting documents in which images and characters of versatile fonts and sizes are included, wherein the characters are transmitted in a form of character codes except for selected characters that are transmitted after conversion into image data.

Another object of the present invention is to provide a mixed mode terminal for transmitting documents in which images and characters of versatile fonts and sizes are included, comprising: character inputting means for inputting characters that are selected from a set of predetermined characters to produce character data corresponding to the inputted characters; image inputting means inputted with an input image for converting the input image into first image data; modification data inputting means for inputting modification data indicating modification of the character data of the characters that are inputted by the character inputting means; character data modification and conversion means supplied with the modification data and the character data for converting the character data into second image data representing a character that has been modified according to the modification data; document editing means supplied with the character data, the first image data and the modification data for producing a first mixed mode document wherein the character data, the first image data and character data that are modified according to the modification data are assembled into a desired arrangement, said document editing means producing layout data that specifies the desired arrangement of the character data, the first image data and the character data that are modified in the first mixed mode document; document synthesis means supplied with the character data, the first image data, the second image data, and the layout data for assembling the character data, the first image data and the second image data into a second mixed mode document according to the layout data; and transmission means supplied with the second mixed mode document for transmitting the same over a telecommunication network. According to the present invention, only those characters of which size and font are to be changed or only the lines that cannot be transmitted in the form of character codes are transmitted in the form of image data. Thereby, the rest of the characters are transmitted in the form of the character code and the efficiency in the transmission is significantly improved. Further, the characters that are transmitted in the form of the character codes are reproduced in the reception side terminal with an ideal quality.

Other objects and further features of the present invention will become apparent from the following detailed description when read in conjunction with the attached drawings.

BRIEF DESCRIPTION OF THE DRAWINGS

FIGS. 4A–4C are diagrams showing an example of layout of the mixed mode document together with layout data indicating the layout of the document.

DETAILED DESCRIPTION

Figure 1:
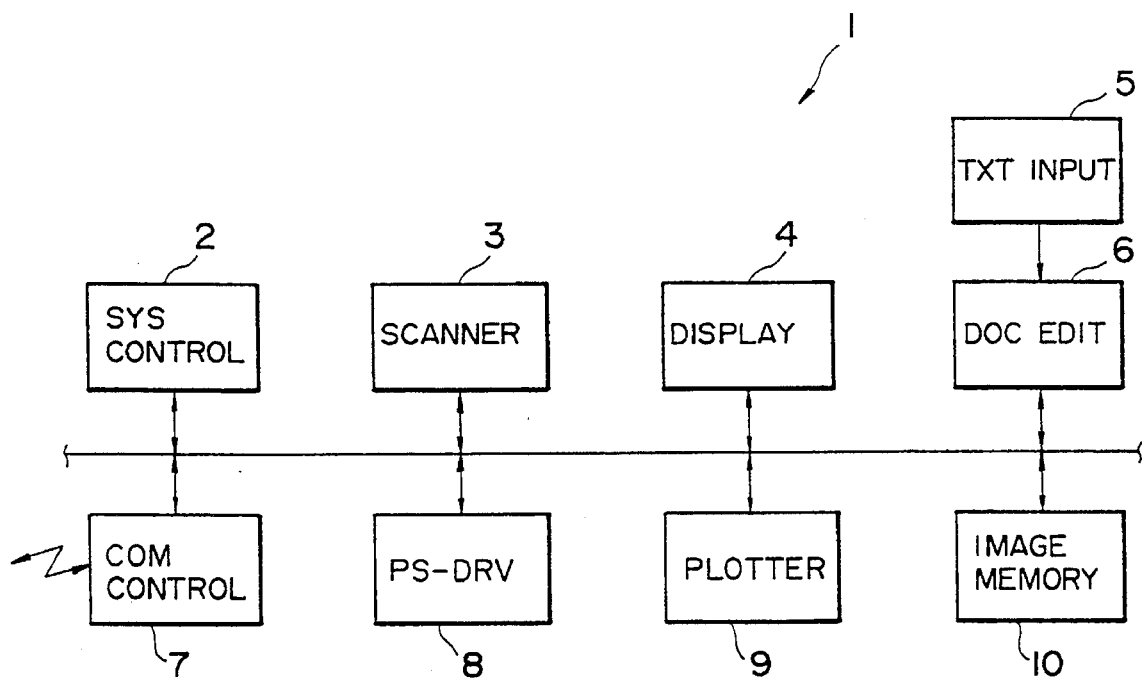
FIG. 1 is a block diagram showing the basic construction of the mixed mode telecommunication terminal according to an embodiment of the present invention.

Hereinafter, the present invention will be described with reference to FIG. 1 showing the basic construction of the telecommunication terminal according to an embodiment of the present invention.

Referring to FIG. 1 showing a mixed mode telecommunication terminal 1, the terminal comprises a system controller 2 for controlling the overall operation of the telecommunication terminal 1. The controller 2 includes a central processing unit (CPU), a random-access memory (RAM), and a read-only memory (ROM), wherein the CPU carries out a predetermined control procedure of the G4 facsimile system defined in the CCITT recommendation, based on the program stored in the ROM. Thereby, the RAM is used as the work area of the CPU.

The controller 2 is connected via a system bus 11 to a scanner 3 that acts as image inputting means for inputting image data. The scanner 3 may be a line scanner using the charge-coupled device (CCD) and produces the image data by reading images recorded on a sheet one-line by one-line.

Further, there is provided a display 4 connected to the system bus 11, wherein the display may include a display device such as CRT (cathode ray tube) or liquid crystal display panel for displaying the image data inputted from the scanner 3 or for displaying character data inputted from a text input unit to be described. Thereby, the operator of the terminal can edit documents while viewing the display 4.

In order to input the character data to the terminal, there is provided a text input unit 5, wherein the text input unit 5 is used to input character data, modification data for modifying the inputted characters as well as other data such as line data. The text input unit 5 may include a keyboard and the like, and the operator can input desired characters from the keyboard. The characters that can be inputted via the keyboard may include those specified in the CCITT recommendation—denoted hereinafter as CCITT characters—and those not specified. In the latter case, the operator once inputs the character as the CCITT character and then inputs modification data to modify the character that has been inputted previously. Thereby, the user can freely modify the font and size of the character while viewing the display 4 on which the result of modification is displayed. Further, the text input unit 5 has the capability of inputting various lines and curves designated hereinafter generally as lines, by specifying the range and direction in which the lines are to be drawn together with the thickness and other features of the lines. The so-called page description language may be used for the modification data.

Further, a document creating part 6 is provided in the mixed mode telecommunication terminal 1. The document creating part 6 may be a word processor having the capability of DTP and connected to the text input unit 5 for receiving the character data as well as other data such as the line data and the modification data. Further, the part 6 is connected to the system bus 11. Thereby, the document creating part 6 is supplied with the image data from the scanner 3 via the system bus 11 in addition to the data from the text input unit 5 and the user can edit the mixed mode document, using the document creating part 6.

The terminal is further equipped with a communication controller 7 that is connected with external telecommunication network (not shown) for establishing connection with destination terminals. The terminal carries out transmission and reception of mixed mode data, teletex data and facsimile data in accordance with the Class-III protocol of the G4 facsimile system.

It should be noted that the character data of the characters not included in the CCITT character set such as the modified character data or the line data are not possible to transmit as the character code in the Class-III protocol of the G4 facsimile system. In order to handle such cases and to transmit the character data that are not included in the CCITT character set, the telecommunication terminal 1 includes a PS driver unit 8 to be described later.

The mixed mode telecommunication system 1 further comprises a printer 9 and an image memory 10 as usual, wherein the image memory 10 is formed from character area 10a for storing the character codes of the CCITT characters, an image area 10b for storing the bit map data for the image data produced by the scanner 3, a modified character area 10c for storing bit map data produced by the PS driver 8 in correspondence to the non-CCITT characters inputted by the inputting unit 5, and a line image area 10d for storing bit map data produced by the PS driver 8 in correspondence to the lines inputted by the inputting unit 5.

Next, the operation of the terminal 1 will be described. The operation of the terminal 1 is characterized by the transmission of documents that contain fonts and sizes of characters that are not defined in the CCITT recommendation. In addition to the capability of transmission, the terminal 1 of course has the capability of creating documents that contain various lines and characters having fonts and sizes that are not included in the CCITT recommendation. In transmission, only those characters and lines that are not defined in the CCITT recommendation are transmitted after conversion into the bit map data in the PS driver 8, while the rest of the characters, that is, the CCITT characters are transmitted in the form of the character code. Thereby, the quality of the reproduced documents is significantly improved and the time needed for transmission is substantially reduced.

Hereinafter, the details of the foregoing transmission process will be described with reference to FIG. 2.

Figure 2:
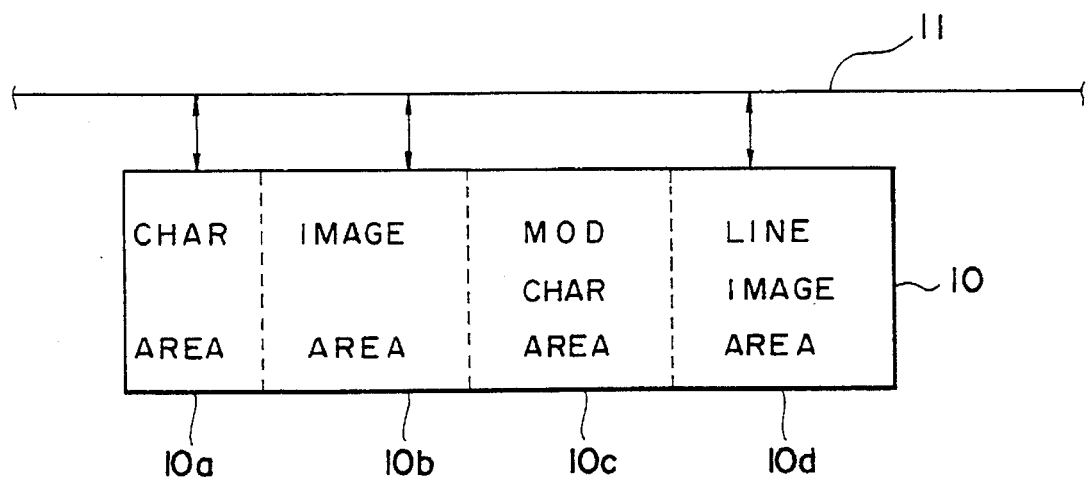
FIG. 2 is a schematical diagram showing the image memory used in the terminal of FIG. 1.

Referring to FIG. 2, in a step P0, a document is created in the document creating part 6 using characters of various sizes and fonts as well as various lines and various images arranged into a desired layout. The layout is displayed at the display 4 and the operator can confirm how the document looks like in the printed form, using the display. In other words, the document creating part 6 forms a DTP system together with the keyboard in the text input unit 5 and the display 4.

Figures 4A, 4B:
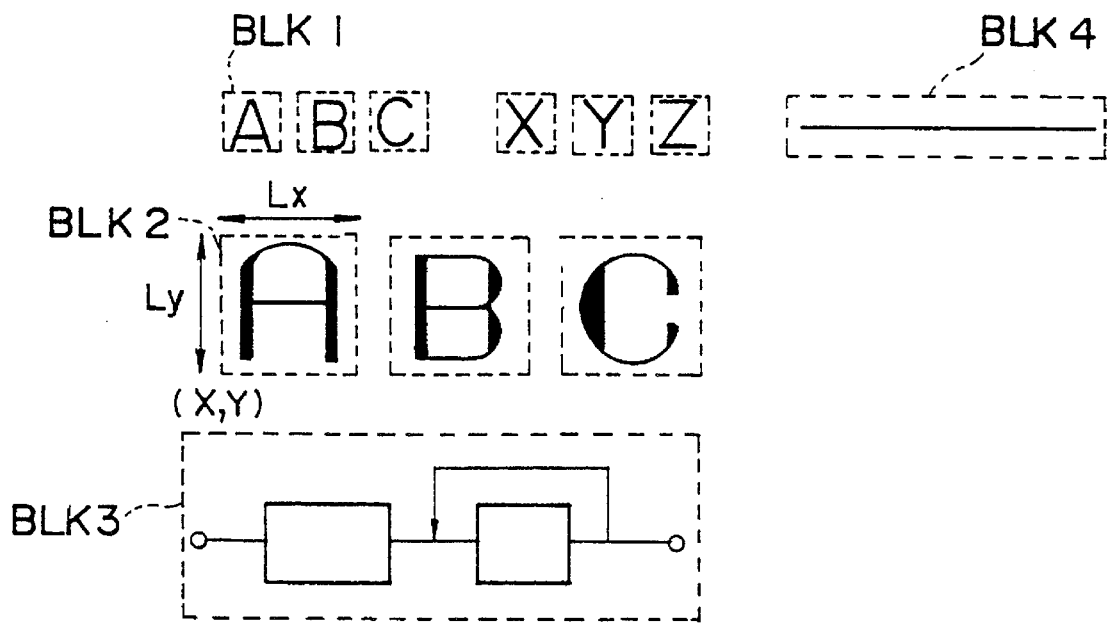

In the document that is created by the document creating part 6, each character, image or line is assigned with a block, examples shown in FIG. 4A. Referring to FIG. 4A, BLK1–BLK 4 show typical examples of such blocks. Therein, the blocks have respective coordinates, sizes and attributes as shown in FIG. 4B. In the BLK1, the location of the block is given by (X1, Y1), the size given by (Lx1, Ly1), and the attribute given by "CHAR," in which the attribute CHAR indicates the block is for the characters. For the images, blocks are assigned as shown in FIG. 4A by the BLK3, wherein the block is defined by the coordinate (X3, Y3), size (Lx3, Ly3), attribute (IMG) and resolution of the image. In the BLK4, the attribute IMG indicates that the block is for the images and the attribute "HIGH" indicates that the image is a high resolution image. Similarly, there are defined blocks such as BLK2 for those characters that have been modified. The block BLK2 has an attribute "MOD/CHAR" indicating that the block is for the modified characters.

Figure 3:
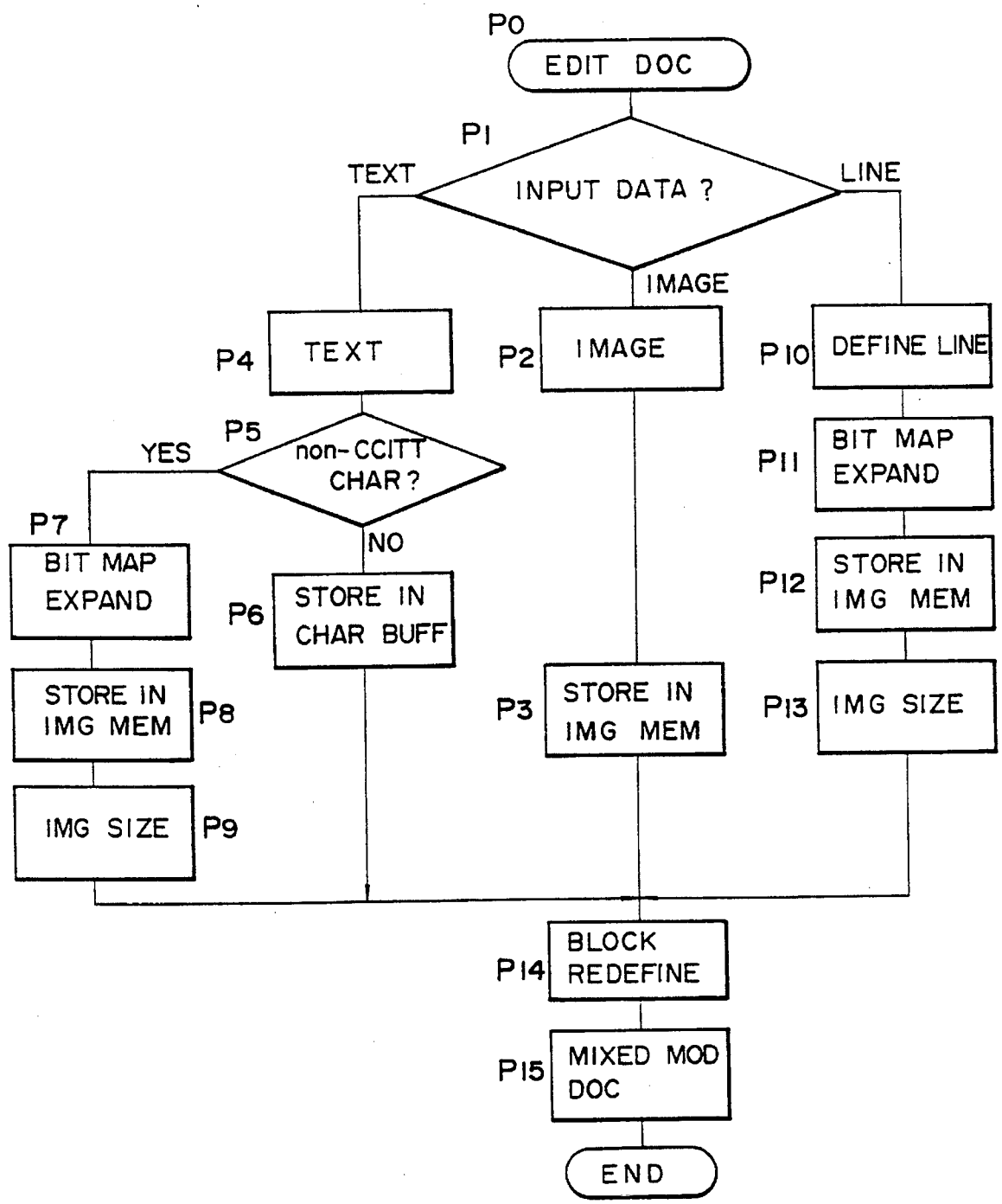
FIG. 3 is a flowchart showing the transmission process carried out in the terminal of FIG. 1.

Referring to the flowchart of FIG. 3 again, the system controller 2 checks, in a step P1, the block of the created document one by one and identifies the attribute of the block. When it is discriminated that the given block is for the images, the data corresponding to the block is expanded into a corresponding bit map in a step P2 that follows. Further, the bit map data is transferred to the image memory 10 in a step P3. There, the data is stored in the image area 10b together with the block data including the coordinate and the size of the block.

When the controller 2 has discriminated that the given block of the document is the block for characters, on the other hand, the controller 2 reads the character in a step P4 and carries out a further discrimination in a step P5 whether the character is the CCITT character or not, based upon the attribute of the block. When the result of discrimination is "NO" indicating that the character is the one of the CCITT characters, the character is immediately transferred from the document creating part to the image memory 10 and stored in the character buffer area 10a in a step P6, together with the coordinate and size of the block.

On the other hand, when the system controller 2 has discriminated that the data in the given block of the document is for the character that is not the CCITT character, the character data of the fundamental CCITT character that provides the fundamental feature of the desired character, is transferred to the PS driver 8 together with the modification data that specifies the modification of the fundamental CCITT character to form the desired character. It should be noted that this modification data is given together with the character data of the fundamental CCITT character from the document creating part 6 and may be described in the page description language (PDL).

In the PS driver 8, the given fundamental CCITT character is modified by the modification data in a step P7, and a bit map corresponding to the desired character is produced. It should be noted that this desired character is the character that is presented to the operator at the display 4 during editing. Subsequently to the step P7, the bit map data thus obtained is transferred to the image memory 10 and stored in the modified character area 10c.

Next, in a step 9, an area to be occupied by the desired character thus produced is defined. The area corresponds to the rectangular area that defines the block shown by BLK2 in FIG. 4A, and the size (Lx, Ly) for the character thus produced is obtained.

When the system controller 2 has discriminated that the given block is the one for the lines in the discrimination step P1, the system controller 2 recognizes the range and type of the line that is specified by the line data in a step 10. There, the beginning and ending of the line is recognized together with the type of the line such as the line is a straight line, a corrugated line, a thin line, a bold line, and the like, and the data characterizing the line thus obtained is transferred to the PS driver 8 via the system bus 11 under control of the controller 2.

In a step 11 following the step 10, the line data is converted into corresponding bit map data in the PS driver 8, and the bit map data thus obtained is stored in the line image area 10d of the image memory 10 in a step 12. Further, in a step 13, the size of the line image thus obtained, in other words, the size of the block of the line on the final printout, is detected.

In a step P14, the coordinate and size of the blocks of the data thus stored in the image memory 10 are redefined. More specifically, the coordinate and the size of the blocks for the CCITT characters and for the image data that have not experienced conversion in the PS driver 8 are not changed at all as shown in FIG. 4C. On the other hand, the coordinate and the size of the blocks for the characters not included in the CCITT character set or those of the blocks for the lines that have experienced the conversion into the bit map data in the PS driver 8 are updated using the size that has been determined in the step P9 or step P13.

In a step P14, the character codes in the character buffer area 10a and the image data in the areas 10b–10d of the image memory 10 are assembled in accordance with the updated blocks to form mixed mode data, and the mixed mode data is transmitted to the destination terminal under control of the communication controller 7.

As already described, the mixed mode communication terminal of the present invention is not only capable of transmitting the CCITT characters and images with an excellent quality and excellent transmission efficiency but also capable of transmitting other characters and lines that could not be transmitted in the conventional mixed mode terminals, by automatically discriminating the attribute of the data.

Further, the present invention is not limited to these embodiments described heretofore, but various variations and modifications may be made without departing from the scope of the invention.

What is claimed is:

1. A mixed mode telecommunication terminal for transmitting documents, comprising:

character inputting means for inputting characters that are selected from a set of predetermined, standard characters to produce character data corresponding to said inputted characters, said character data representing said standard CCITT characters being used commonly among different terminals for transmission of characters;

image inputting means for inputting an input image, said image inputting means converting said input image into bitmap data;

modification data inputting means for inputting modification data indicating modification of the character data of said inputted characters that are inputted by said character inputting means;

character modification means supplied with said modification data and said character data for converting said character data into modified character data representing non-standard characters not included in said set of predetermined characters, said character modification means converting said character data into modified character data for each of said non-standard characters;

discrimination means supplied with said character data and said modified character data respectively from said character inputting means and said character modification means as input data for discriminating whether said input data is formed of said character data or said modified character data, said discrimination means converting said input data into character bitmap data according to instruction information that contains font type and font size of a character when said input data is formed of said modified character data;

document editing means supplied with said character data, said image bitmap data and said character bitmap data for producing a mixed mode document wherein said character data, said image bitmap data and said character bitmap data are assembled with each other, said document editing means producing layout data that specifies a layout of said mixed mode documents with respect to a desired arrangement of said inputted characters, said input image and said characters that are modified;

document synthesis means supplied with said character data, said image bitmap data, said character bitmap data, and said layout data for producing mixed mode document data corresponding to said mixed mode document according to said layout data; and transmission means supplied with said mixed mode document data for transmitting the same over a telecommunication network.

2. A mixed mode telecommunication terminal as claimed in claim 1 in which said discrimination means produces said character bitmap data such that the character that has been modified according to said modification data has a size and font that are specified by said modification data.

3. A mixed mode telecommunication terminal as claimed in claim 1 in which said mixed mode telecommunication terminal further comprises line image inputting means for inputting an image of a line, said line image inputting means producing line data corresponding to said line image and supplying said line data to said discrimination means, wherein said discrimination means achieves a discrimination process for discriminating whether said input data supplied thereto is formed of said line data or not and converts said input data to line bitmap data when it is discriminated that said input data is formed of said line data, said discrimination means further supplying said line bitmap data to said document editing means, said document editing means producing said mixed mode document by assembling said line image together with said inputted characters, said input image and said characters that are modified, said document synthesis means producing said mixed mode document data by assembling said line bitmap data, said character data, said image bitmap data and said character bitmap data together.

4. A mixed mode telecommunication terminal as claimed in claim 1 in which said document editing means produces said layout data as a coordinate and a size of the characters as appearing on a recording sheet when the mixed mode document is recorded on the recording sheet.

5. A mixed mode telecommunication terminal as claimed in claim 1 in which said document editing means produces said layout data that indicates a coordinate and a size of the character in said mixed mode document for those characters that are inputted by the character inputting means and for those characters that are modified according to said modification data, said document editing means further producing said layout data such that the layout data includes data for coordinate and size of the images included in said mixed mode document.

6. A mixed mode telecommunication terminal as claimed in claim 1 in which said document synthesis means comprises means for discriminating the size of an image formed in said mixed mode document in correspondence to said image bitmap data and modify said layout data given by said document editing means, said document synthesis means assembling said character data, said image bitmap data and said character bitmap data to form said mixed mode document data according to the modified layout data.

7. A mixed mode telecommunication terminal as claimed in claim 6 in which said document synthesis means further comprises display means for displaying said mixed mode document.

8. A mixed mode telecommunication terminal as claimed in claim 1 in which said document editing means defines a block region on said mixed mode document in correspondence to each of said characters, said input image and said modified characters, each of said block regions having a coordinate indicative of a position of said block region on said mixed mode document and a size of an area of said mixed mode document that is occupied by said block region.

9. A terminal according to claim 1, wherein:
the discrimination means converts said input data into character bitmap data according to the instruction information which is described in a page description language.

* * * * *